United States Patent [19]

Simons et al.

[11] 4,041,148

[45] Aug. 9, 1977

[54] NEW AEROSOL PROPELLANTS FOR PERSONAL PRODUCTS

[75] Inventors: Charles W. Simons, Bedford; Gerald J. O'Neill, Arlington; Joel A. Gribens, Framingham, all of Mass.

[73] Assignee: W. R. Grace & Co., Cambridge, Mass.

[21] Appl. No.: 714,522

[22] Filed: Aug. 16, 1976

Related U.S. Application Data

[63] Continuation-in-part of Ser. No. 622,246, Oct. 14, 1975, abandoned.

[51] Int. Cl.² .............................................. C09K 3/30
[52] U.S. Cl. .................................... 424/45; 252/305; 424/47
[58] Field of Search ........................... 252/305, 522; 260/614 F; 424/45, 46, 47

[56] References Cited

U.S. PATENT DOCUMENTS

| 3,362,180 | 1/1968 | Eiseman | 62/112 |
| 3,502,588 | 3/1970 | Winberg | 252/188.3 R |
| 3,719,752 | 3/1973 | Taylor | 252/305 X |
| 3,723,318 | 3/1973 | Butler | 252/305 X |
| 3,887,439 | 6/1975 | Hutchinson | 203/63 |
| 3,922,228 | 11/1975 | Hutchinson | 252/305 X |

*Primary Examiner*—Harris A. Pitlick
*Attorney, Agent, or Firm*—Armand McMillan; C. E. Parker; E. J. Hanson, Jr.

[57] ABSTRACT

Certain fluorinated dimethyl ethers have been found to possess the stability, the compatibility and sufficient freedom from deleterious physiological effects to be used as aerosol propellants in cosmetic, hygenic, pharmaceutical and other personal products. These compounds, bis(difluoromethyl) ether and perfluorodimethyl ether, are also free of the chlorine atoms believed responsible for some destruction of ozone in the upper atmosphere.

4 Claims, No Drawings

NEW AEROSOL PROPELLANTS FOR PERSONAL PRODUCTS

CROSS-REFERENCE TO RELATED APPLICATION

This application is a continuation-in-part of application Ser. No. 622,246 filed on Oct. 14, 1975 and now abandoned.

THE PRIOR ART

The task of finding acceptable replacements for the widely used halocarbon aerosol propellants is not an easy one. Over the years, most compounds capable of generating the necessary pressures under packing conditions have been tried, and the industry has settled for reasons of performance, safety and cost on a relatively limited number of gaseous liquefiable hydrocarbons, chlorofluorocarbons and a few other common non-toxic gases such as nitrous oxide and carbon dioxide.

Until recently, chlorofluorocarbons such as propellant 11 (trichloromonofluoromethane) and propellant 114 (dichlorotetrafluoroethane), to name a few, appeared ideally suited for aerosol propulsion in terms of stability, chemical inertness, compatibility with aerosol package ingredients, lack of toxicity and pressure-generating capacity. While they still benefit from this excellent combination of physical and chemical properties within the aerosol pack area, their continued use is being increasingly challenged because of their alleged deleterious effect on the layer of ozone in the upper atmosphere of the planet. In these circumstances, the search for acceptable substitutes has become imperative. Gases must be located that possess essentially the same assortment of properties as the chlorofluorocarbons but are free of the ozone-destroying chlorine.

In this respect, a review of the art for chlorine-free, stable compounds capable of generating the necessary pressures did not prove very fruitful. For instance, a few patents exists which teach the use of dimethylether as aerosol propellant (U.S. Pat. No. 1,800,156). The extreme flammability of this compound, however, accounts for its lack of favor over the years even though attempts have been made to circumvent part of its disadvantages by spraying it together with an aqueous aerosol phase (U.S. Pat. No. 3,207,386). As to the possibility of altering this undesirable facet of what might otherwise be an acceptable propellant, by fluorination for instance, the art would only lead the skilled practitioner to negative conclusions about said possibilities. In terms of chemical stability, to begin with, it is known that halogenation of the alpha-carbon of methyl ethers causes instability in the molecule. Thus, compounds such as $CHF_2.O.CH_3$ decompose either on standing or on distillation, $CH_2F.O.CHF_2$ decomposes in glass, while other fluorinated methyl ethers are unstable under hydrolytic conditions such as may be found in aerosol preparations. The fluorinated methyl ethers did not therefore appear very promising on that account.

More importantly from the point of view of ecology, safety and health with which the present invention is concerned, it must be realized that whatever limited knowledge was available on the physiological properties of fluorinated ethers was certainly not conducive to the selection of such compounds for use as propellants in aerosol packaging, especially of personal products such as toiletries and medicinals. Note the words of Larsen in this respect [Fluorine Chemistry Rev., Vol. 3 (1969), page 20] when he states that "as a class, fluorinated ethers show the widest spectrum of unpredictable biological response, with some being extremely potent convulsants while others are excellent anesthetics." Obviously, neither of these properties has any appeal for uses such as those presently contemplated. A striking illustration of what can be expected from fluorinated ethers in general is afforded by the fact that bis(2,2,2-trifluoroethyl)ether, a compound very closely related chemically to those of the present invention, can evoke seizures in rats at concentrations as low as 30 parts per million (weight/volumn). It is interesting to note also that this particular diethyl ether finds use as a therapeutic convulsant in mental therapy [Goodman & Gilman, The Pharmaceutical Basis of Therapeutics, 4th edition, pages 355-6, The Macmillan Co. (1970)]. There is no need to list here any later published data in support in Larsen's views on fluorinated alkyl ethers. Let us just say that the recent developments in the fields of anesthesia and mental therapy generally confirm these views.

As to the aerosol field, the most recent pertinent art reveals that two new azeotropic mixtures composed of pentafluorodimethyl ether and dimethyl ether can be used, inter alia, as propellants (U.S. Pat. No. 3,922,228). The impact of this specific disclosure on the newly discovered utility of the two ethers with which the present application is concerned shall be discussed later in conjunction with the disclosure of the biological behavior of the components of said azeotropic mixtures. This then is the field in which the present inventors prospected in order to find the substitutes for the chlorofluorocarbon propellants that are eagerly sought by industry and government agencies such as EPA (Chem. Eng. News, Concentrates, Jan. 12, 1976).

SUMMARY OF THE INVENTION

It has now been discovered that bis(difluoromethyl)ether and perfluorodimethyl ether may be used as propellants in aerosol containers in any proportion that will yield useful pressures. These compounds do not contain any chlorine and will not therefore contribute to the destruction of atmospheric ozone that is said to take place when convenional chloride-containing propellant gases accumulate in the upper atmosphere. Furthermore, the two compounds have been found to be stable and non-toxic, unlike other known fluorinated methyl ethers.

DETAILED DESCRIPTION

The compounds used in the present invention are those symmetrical dimethyl ethers constituted by methyl groups on which at least two of the hydrogen atoms have been replaced by fluorine atoms.

The two compounds in this class have been found to possess the correct combination of physical, chemical and biological properties which allows their use in aerosol packaging. They are stable on storage, resistant to alkaline hydrolysis and not flammable, even in direct contact with a torch. Their boiling points are $-2°$ and $-55°$ C for the bis(difluoromethyl)ether and the perfluorodimethyl ether respectively, which corresponds to vapor pressures ranging from 20 to 210 psig under standard conditions of temperature and pressure.

In preparing an actual aerosol package, the desired pressure is achieved by mixing one or more of these propellants with other liquids involved in the aerosol preparation and this in whatever proportions indicated by the conditions at hand. The propellants of this invention may also be used together with other conventional gaseous aerosol propellants in order to achieve various purposes such as changes in compatibility with specific aerosol preparation ingredients, cost, rate of delivery and the like. Among usable propellants of that class are conventional gases such as nitrous oxide, carbon dioxide, non-halogenated hydrocarbons as well as fluorohydrocarbons, preferably — in view of the principal object of the present invention, those that do not contain any chlorine atoms. As to the liquid carrier for the product to be dispensed, which does affect the ultimate vapor pressure of the pack, it is selected from conventional materials including ethyl alcohol, perchloroethylene, trichloroethylene, acetone, amyl acetate, water and the like.

In addition to the properties already described for the ethers of this invention, it must be noted that at the concentrations likely to be created when aerosol products with which they are packed are dispensed, no deleterious physiological effects will take place. The compounds are not toxic and do not cause convulsions. In terms of anesthetic effects, their behavior ranges from mild activity on two-hour exposure in mice for the tetrafluoro homolog to no activity at all for the hexafluoro homolog. The active species, the tetrafluoro compound, compares favorably in fact with plain dimethyl ether in that it has a greater safety margin than the latter, as indicated by the standard anesthetic index (A.I.) value for each compound, said values being $>3$ and 1.3, respectively.

In view of the known chemical instability of ethers in which hydrogen atoms on the alpha-carbon have been replaced by fluorine atoms — an instability which yields toxic products such as hydrogen fluoride for example, and also in view of the number of known fluorinated dialkyl ethers which cause convulsion when administered to mammals in small concentration, the ethers of this invention were tested for biological activity. The conventional tests that were carried out yielded the following data:

BIOLOGICAL TESTING OF FLUORINATED DIMETHYL ETHERS

Bis(difluoromethyl)ether.

Mice were exposed to various concentrations vapors of the ether in a chamber equipped with a bed of soda lime to absorb carbon dioxide. The procedure used is standard for evaluation of inhalation anesthetic and is similar to that of Robbins [Pharmacology and Experimental Therapeutics 86, 197 (1946)]. Ten mice were exposed to each concentration tested for a period of two hours. It was thus determined that bis(difluoromethyl)ether is anesthetic but not toxic at concentrations of up to slightly more than 20% by volume and that the recovery time of mice anesthetized with the material is about 2 minutes. No deaths were observed during and after exposure at those levels. The anesthetic index of the tetrafluorometyl ether was determined to be $>3$ which compares favorably, from the safety point of view, with that of dimethyl ether, 1.3. The safety of the fluorinated ether was further determined by exposing rats to a 5% concentration during 3 hours a day for 5 days, with no signs of convulsions nor deaths being noted.

Perfluorodimethyl ether

This compound was tested by exposing 6 mice a concentration of vapors as high as 75% by volume for a period of 60 minutes. No recognizable biological effect was noted during and after exposure. This is quite different from the behavior of the hexafluorodiethyl ether discussed in the prior section which causes convulsions in rats at 30 ppm.

Pentafluorodimethyl ether

This compound was tested, again by exposing six mice to various vapor concentrations for a period of 60 minutes. All mice died either within 75 minutes of exposure or by the next morning when concentrations of 50, 25 and 12.5% were used. No discernable effects were noted at 6 and 9% vapor concentrations. Upon autopsy, it appeared that the mice died of pulmonary edema. Stable concentrations of the ether during the test and the results of gas chromatography monitoring of the vapors substantially ruled out the presence of both initial impurities and later breakdown or metabolic products of the ether.

The picture that emerges from these tests and from the fluorinated alkyl ether prior art discussed earlier is that the two ethers with which this invention is concerned are surprisingly different from most such alkyl ethers, and especially from the pentafluorodimethyl ether that has been said to have some utility, not by itself, but as a member of an azeotropic mixture with dimethyl ether (U.S. Pat. No. 3,922,228).

However, as the data just disclosed shows, that pentafluoro compound is not suited for use in aerosolized personal products, such as toiletries and medicines, which must come in intimate contact with the user in order to be effective.

The following examples are provided to illustrate various non-limiting embodiments of the invention. Unless otherwise noted, all proportions used are on a weight basis. Also in each preparation the propellant, the ethyl alcohol and the aerosol can are cooled to $-25°$ C to facilitate the loading operation.

EXAMPLE 1

A mixture consisting of 9.01% perfluorodimethyl ether and 90.99% bis(difluoromethyl) ether was formed and showed a vapor pressure of 36 psig at room temperature. Adding this mixture, 55.5 g, to denatured ethanol, 55 g, yielded a vapor pressure of 26 psig. When transferred to an aerosol can fitted with a valve assembly, it provided a fine aerosol spray on activation of the valve.

EXAMPLE 2

A mixture consisting of 23.08% perfluorodimethyl ether and 76.92% bis(difluoromethyl) ether had a vapor pressure of 50 psig when tested by puncturing the bottom of an aerosol can with a special pressure gauge.

EXAMPLE 3

A mixture consisting of 50.43% dimethyl ether and 49.57% bis(difluoromethyl) ether was found to have a vapor pressure of 40 psig. When this mixture, 46 g, was placed in an aerosol can with denatured ethanol, 45 g, giving a 1:1 mix, a fine aerosol spray could be produced.

Mixtures of this type are particularly suitable as propellants for inhaled aerosols. These are metered and of small capacity, so that the flammability and abuse potential of dimethyl ether are not of concern. The technique, on the other hand, renders available the virtues of dimethyl ether, namely its benign action on the heart, a vapor pressure sufficiently high (62 psi at room temperatures) to permit blending with dis(difluoromethyl) ether, and, because of solvent capacity, a probably high compatibility with drugs.

EXAMPLE 4

Bis(difluoromethyl) ether, 23.1 g, was added to denatured ethanol, 26.7 g. The resulting mixture had a vapor pressure of 5 psig. Despite this low pressure value, an aerosol system activited by this mixture formed a good aerosol spray.

This particular type of low pressure formulation is singularly suitable for pressurizing glass-contained aerosol systems such as are preferred for esthetic reasons for dispensing perfumes, colognes and other toiletries.

EXAMPLE 5

A mixture consisting of 27.32% perfluorodimethyl either and 72.68% bis(difluoromethyl) ether was made up in a metal cylinder. The pressure of the system was found to be 75 psig. The tetrafluoromethyl ether used in this example contained a significant quantity of a trifluoroethane which served to raise the vapor pressure of the mixture above the value to be expected from the ethers alone.

EXAMPLE 6

Again, perfluorodimethyl ether was mixed with bis(difluoromethyl) ether in proportions of 22.2% to 77.80% respectively. The tetrafluoro ether used was that of Example 5, i.e. containing a significant quantity of a trifluoroethane. The propellant mixture, 107.2 g, was placed into an aerosol can with an equal weight of denatured ethanol, the can was fitted with a valve and sealed. A good aerosol spray was obtained on activation. On puncturing the can with a pressure gauge, a reading of 56 psig was observed.

EXAMPLE 7

A 3% by weight solution of sorbitan trioleate was made in bis(difluoromethyl) ether. There appeared to be no miscibility problems. Sorbitan trioleate is commonly used as a vehicle for pharmaceutical aerosols such as, for instance, isoproterenol sulfate.

EXAMPLE 8

A fragrance aerosol was prepared in a glass bottle, using the following ingredients:

|  | weight |
| --- | --- |
| Fragrance oil | 2.5% |
| Ethanol, 95% | 47.5% |
| Bis(difluoromethyl) ether | 47.5% |
| Perfluorodimethyl ether | 2.5% |

A good spray was produced and, after one month storage, no change in color or odor could be observed.

It will be evident to the man skilled in the art that the aerosol pressurizing systems disclosed here can be employed with a large number of conventionally aerosol packaged materials such as toiletries, household and personal hygienic products, pharmaceuticals and medicines, and generally any other type of product generally packed with the chlorofluoroalkanes of the art, especially when the mode of use of such product involves a toxicity potential for living species. Specific examples of aerosol packs in which the present propellants hold particular promise include such products as hair sprays, shaving preparations, colognes, perfumes, drugs for respiratory relief, antibiotics, antiperspirants, household insecticides, and the like. Furthermore, it shall be found in many instances that in terms of compatibility with both organic an inorganic materials, the ethers of the present invention are superior to the oxygenfree molecules of the chlorofluoroalkanes.

What we claim is:

1. An aerosol container pressurized by a material selected from the class consisting of bis(difluoromethyl) ether, perfluorodimethyl ether and mixtures thereof.

2. The container of claim 1 wherein the pressurizing material additionally contains up to 50% by weight of dimethyl ether.

3. The container of claim 1 wherein the pressurizing ether employed is bis(diflouromethyl) ether which is mixed with denatured ethanol in a weight ratio of about 50:50.

4. The container of claim 1 in which there is packaged a personal product selected from the class consisting of toiletries, hygienic preparations and pharmaceuticals.

* * * * *